US009766428B2

(12) United States Patent
Smith et al.

(10) Patent No.: US 9,766,428 B2
(45) Date of Patent: Sep. 19, 2017

(54) MIRROR ASSEMBLY WITH ADJUSTABLE FASTENING

(71) Applicants: David Smith, Wetherby (GB); Kees Jan Staats, Bennekom (NL)

(72) Inventors: David Smith, Wetherby (GB); Kees Jan Staats, Bennekom (NL)

( * ) Notice: Subject to any disclaimer, the term of this patent is extended or adjusted under 35 U.S.C. 154(b) by 0 days.

(21) Appl. No.: 14/332,603

(22) Filed: Jul. 16, 2014

(65) Prior Publication Data

US 2015/0022912 A1    Jan. 22, 2015

(30) Foreign Application Priority Data

Jul. 16, 2013 (NL) ........................ 2011171

(51) Int. Cl.
*B60R 1/078* (2006.01)
*G02B 7/182* (2006.01)

(52) U.S. Cl.
CPC ............... *G02B 7/182* (2013.01); *B60R 1/078* (2013.01)

(58) Field of Classification Search
CPC ......... B60R 1/082; B60R 1/081; B60R 1/078; B60R 1/10; B60R 1/06; B60R 1/072; B60R 1/04; B60R 1/0605; G02B 5/09; G02B 7/182
USPC ................. 359/850, 872, 881, 865, 875, 882
See application file for complete search history.

(56) References Cited

U.S. PATENT DOCUMENTS

| 4,486,075 A * | 12/1984 | Cohen | B60R 1/081 |
| | | | 359/840 |
| 5,997,147 A * | 12/1999 | Tatoian | A47B 23/007 |
| | | | 359/856 |
| 6,132,051 A * | 10/2000 | Morell | B60R 1/081 |
| | | | 248/476 |
| 2008/0239532 A1* | 10/2008 | Wu | B60R 1/078 |
| | | | 359/872 |

(Continued)

FOREIGN PATENT DOCUMENTS

| DE | 90 00 392 | 8/1990 |
| DE | 20 2012 008084 | 9/2012 |

(Continued)

OTHER PUBLICATIONS

European Search Report dated Oct. 22, 2013, corresponding to the Foreign Priority Application No. 2011171.

*Primary Examiner* — Stephone B Allen
*Assistant Examiner* — Rahman Abdur
(74) *Attorney, Agent, or Firm* — Young & Thompson

(57) ABSTRACT

A mirror assembly (1) includes a mirror head (4), a bracket (5) fastened to the mirror head, and fastening elements (6) located at the bracket at a distance from the mirror head and connectable to the wing mirror (2) of a vehicle (3). The bracket has bracket parts (7, 8) joined in a longitudinal direction and mutually connected through a pivoting element (9), wherein a bracket part (7) faces towards the mirror head (4) relatively to the pivoting element and another bracket part (8) faces away from the mirror head (4) relatively to the pivoting element. Because one of the fastening elements is located at the bracket part (7) facing the mirror head and another of the fastening elements is located at the bracket part (8) facing away from the mirror head, the mutual orientation of the fastening elements can be adjusted to the exterior shape of the wing mirror.

15 Claims, 2 Drawing Sheets

(56) References Cited

U.S. PATENT DOCUMENTS

2011/0083300 A1\* 4/2011 Heger ..................... B60R 1/06
16/321

FOREIGN PATENT DOCUMENTS

EP 1 935 718 6/2008
GB 2 481 626 1/2012

\* cited by examiner

MIRROR ASSEMBLY WITH ADJUSTABLE FASTENING

The invention relates to a mirror assembly, comprising a mirror head, a bracket fastened to the mirror head, and fastening elements located at the bracket at a distance from the mirror head and connectable to the wing mirror of a vehicle, which bracket comprises bracket parts joined in a longitudinal direction and mutually connected through a pivoting means, wherein a bracket part faces towards the mirror head relatively to the pivoting means and another bracket part faces away from the mirror head relatively to the pivoting means.

Such a mirror assembly is known and can be applied to the usual wing mirror of a vehicle. As an example a passenger car with a coupled caravan is mentioned. Because the caravan is usually wider than the passenger car, so called towing mirrors should be provided so as to provide to the driver a free rear view past the towed caravan.

With this known mirror assembly both fastening elements are embodied as clamps that are fixedly provided at some distance from each other at the bracket part facing away from the mirror head. This means that both clamps have a fixed orientation and position with respect to each other. However, a disadvantage of such a fixed arrangement is that the mirror assembly is actually only suitable for more or less square wing mirrors with a straight upper and lower edge. For wing mirrors having a different, curved shape, this known mirror assembly is not suitable, because the clamps cannot be adjusted to the curved edge of the mirror head.

As such, adjustable clamps for a mirror assembly are know from EP-A-1935718. The clamps are slidably and pivotably arranged to a bracket embodied as a bar. While adjusting the mirror assembly, both clamps must be pivoted separately to the desired orientation, and subsequently fixed separately with respect to the bar. Additionally and preferably, it should be noted that the clamps are each pivoted symmetrically along a similar angle with respect to each other, until the orientation in which the clamps can be slid onto the curved edge of the wing mirror, is reached.

Although the problem of non-fitting clamps is reduced, the separate and more or less simultaneous adjustment and fixation of the clamps seems laborious. It should be noted that the orientation of the clamps influences the orientation of the total assembly. When the clamps are not well adjusted, the mirror assembly can obtain an unwanted oblique orientation.

An object of the invention is therefore to provide a mirror assembly of the type mentioned in the introduction, which can be applied to all kinds of wing mirrors with different shapes, but wherein the adjustment of the mirror assembly can be done in an easier way. This is achieved in that one of the fastening elements is located at the bracket part facing the mirror head and another of the fastening elements is located at the bracket part facing away from the mirror head.

With the mirror assembly according to the invention both clamps can be pivoted with respect to each other by pivoting of only one single hinge, being the hinge between both bracket parts. Hereby symmetrical angular pivoting is automatically ensured, such that each time the mirror assembly can be mounted in the desired orientation relative to the wing mirror. Fixation of the desired orientation can easily be obtained by a single locking that engages said hinge. Such a bracket can for instance be embodied as a jointed bar.

According to a usual method, the bracket can be fastened to the mirror head by a joint, such as a ball joint, in a stable and adjustable way. Moreover, it can be a known joint with a relatively high internal friction, that allows manual adjustment and is yet stable enough to resist forces exerted during the ride. The pivoting means between both bracket parts can comprise a hinge which central axis is directed transverse, preferably perpendicular, to the longitudinal direction of the bracket parts. Alternatively, the pivoting means can be embodied in different ways, such as a ball joint with a fixing clamp or a flexible element.

As mentioned, a locking element can be provided, which is transferable from a release position in which the bracket parts are pivotable with respect to each other, and a locking position in which the bracket parts are locked with respect to each other. Furthermore, the central axis of the hinge is substantially transversely directed to the reflecting surface.

Dependent on the total dimensions of the wing mirror, it may be desirable to position the fastening elements further from or closer to each other. For this the fastening elements can each have a locking means that is adjustable between a release position, in which position the fastening element is slidable along and/or pivotable about the respective bracket part, and a fixation position in which the fastening element is fixed with respect to that bracket part. According to a known method, the fastening elements can each comprise a clamp that is connectable to an edge of the wing mirror.

The invention particularly relates to a mirror assembly for a wing mirror comprising a mirror housing with a rounded edge, in which mirror housing a mirror is accommodated while leaving a slit between the outer perimeter of the mirror and the inner perimeter of the peripheral edge of the mirror housing, and a clamp having a first jaw that is insertable in the slit, a second jaw connectable to the outside of the peripheral edge of the mirror housing and opposite the first jaw, and pressing means, such as a screw/nut connection or another kind of clamping connection, such as a clamping connection according to the toggle lever principle, for pressing the clamps together on the mirror housing.

In addition, the invention relates to, in combination, a mirror assembly as described above, and a wing mirror of a vehicle, to which the mirror assembly is fastened, wherein the wing mirror has a mirror housing with a curved perimeter and wherein the bracket parts of the mirror assembly are fixed with respect to each other at an angle different from zero, such that the fastening elements are each aligned with respect to the respective opposite region of the perimeter of the mirror housing.

Subsequently, the invention will be described according to the embodiment shown in the figures.

Figure 1:
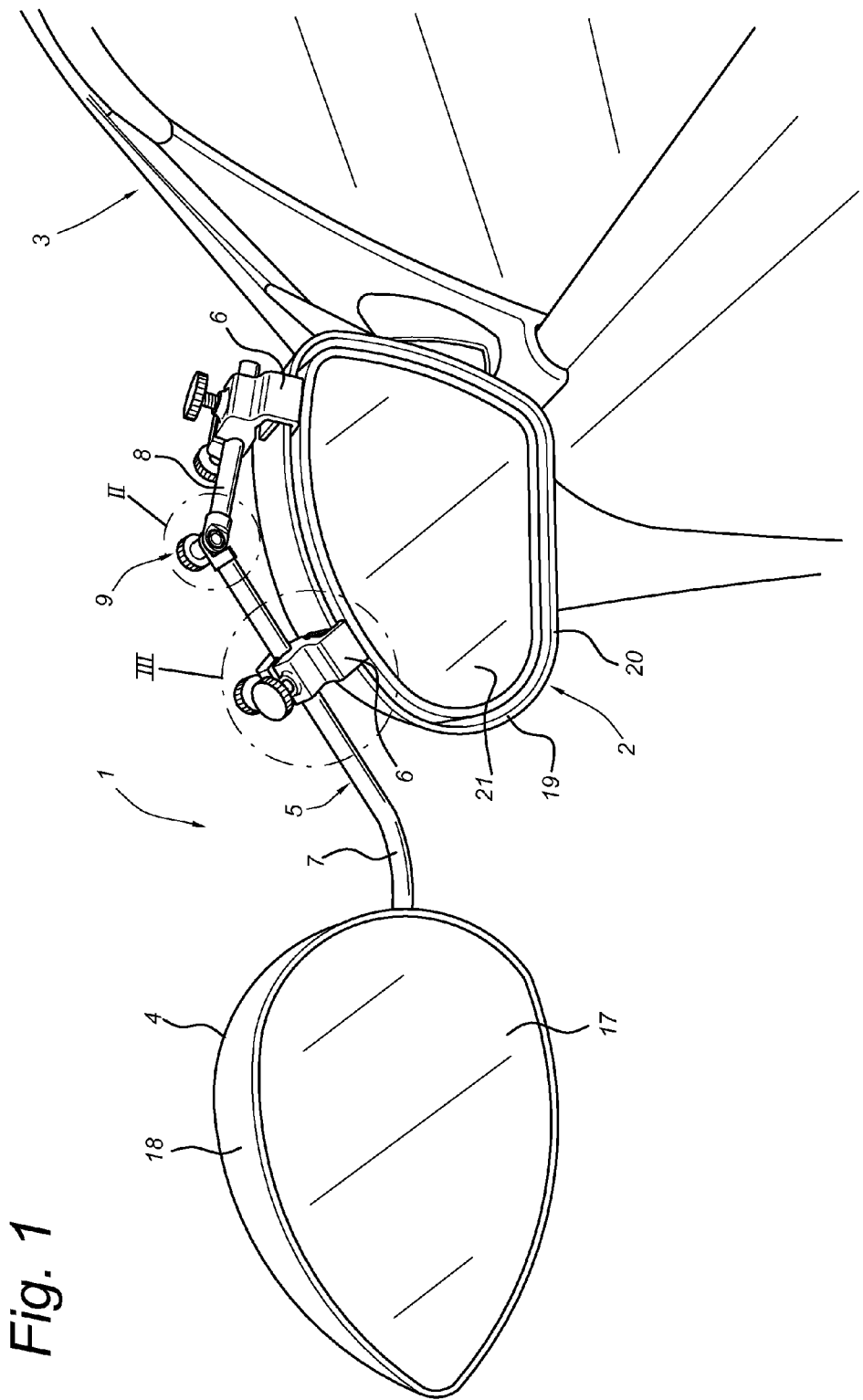
FIG. 1 shows a perspective view of the mirror assembly while fastened to a wing mirror of a vehicle.
Figure 2:
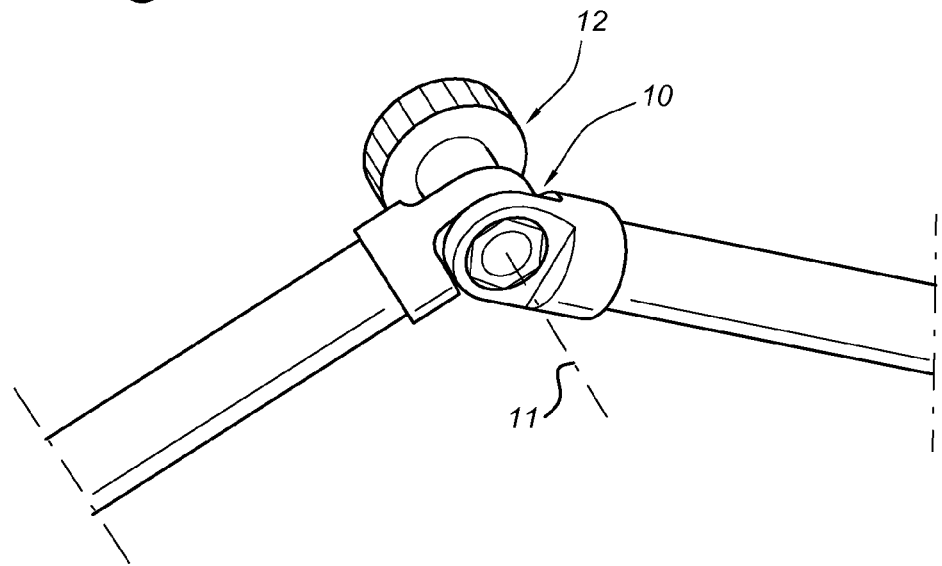
FIG. 2 shows a perspective view of the pivoting connection according to II of FIG. 1.

The mirror assembly 1 shown in FIG. 1 is fastened to a wing mirror 2 of a passenger vehicle 3. This mirror assembly comprises a mirror head 4, a bracket shaped as a joint bar 5 and a pair of clamps 6. The joint bar 5 comprises bar parts 7, 8 and the lockable pivoting connection 9. This pivoting connection 9, shown at a larger scale in FIG. 2, comprises a hinge 10 with central hinge axis 11, and the locking clamp 12. This locking clamp, which will not be detailed further, is known per se and comprises for instance a screw construction. By releasing or tightening this screw construction of the locking clamp respectively, allows the bar parts to pivot with respect to each other along central pivot axis 11, or to be fixed in a certain pivot position with respect to each other. The mirror head 4 comprises a housing 18 and a mirror 17 accommodated therein. Bars 7, 8 can be straight, as shown, or with a curve or a bend.

Figure 3:
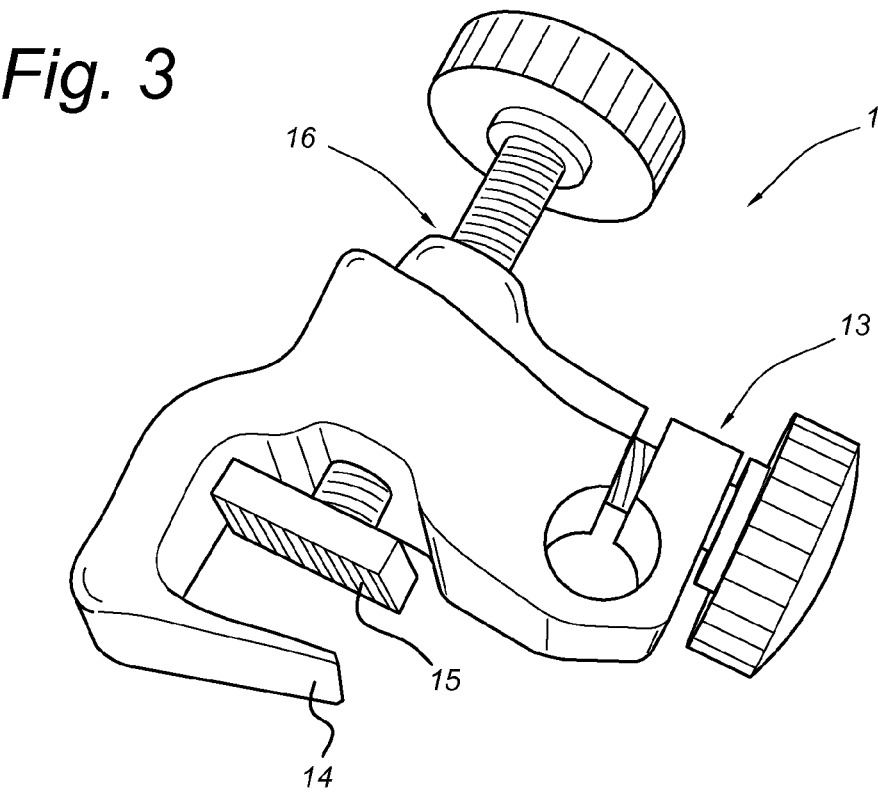
FIG. 3 shows a perspective view of a clamp according to III of FIG. 1.

The clamps 6, as shown in larger scale in FIG. 3, are each mounted to a respective bar part 7, 8, and have a locking means 13. By releasing or tightening this locking means 13, respectively, the clamp 6 can be slid along the respective bar part 7, 8, and pivoted about the longitudinal axis of the bar parts. However, the clamp 6 cannot be pivoted with respect to the respective bar part in a transverse direction to that longitudinal axis. The clamp 6 furthermore has a fixed jaw 14 and a movable jaw 15. The movable jaw can be moved to and fro with respect to the fixed jaw 14 by screw device 16.

In a usual way, the wing mirror 2 has a housing 19 with an edging 20, in which the mirror 21 is accommodated. Between the edging 20 and the mirror 21 is a slit, such that the fixed jaw 14 of the clamps 6 can be slid therein. The movable jaw 15 is located at the outside of the edging; by tightening the screw devices the clamps 6 can be fastened to the housing 19 of the wing mirror 2.

As shown in FIG. 1, the edging 20 of the housing 19 has a curved shape. This means that the clamps 6 can only be fastened to that housing 19 when they are oriented along those curved shapes. This can be achieved by, in the released state of the pivoting connection 9, pivoting the bar parts 7, 8 and with those the fastened clamps, such that the mutual orientation of the clamps fits the shape of the edging part of the housing 19 onto which they are to be fastened. In that orientation the bar parts can be easily fixed with respect to each other by tightening the screw device 16. With that, the mutual orientation of the clamps is fixed as well. Moreover, the bar parts 7, 8 mutually form a rigid unit, which increases the stability of the mirror assembly 1.

LIST OF REFERENCE SIGNS

1. Mirror assembly
2. Wing mirror
3. Vehicle
4. Mirror head
5. Bracket
6. Clamp
7., 8. Bar part
9. Pivoting connection
10. Hinge
11. Central pivot axis
12. Locking clamp
13. Locking means of clamp
14. Fixed jaw
15. Movable jaw
16. Screw device
17. Mirror
18. Housing
19. Housing of wing mirror
20. Edging of housing
21. Mirror

The invention claimed is:

1. Mirror assembly (1), comprising:
    a mirror head (4),
    a bracket (5) fastened to the mirror head, and
    fastening elements (6) located at the bracket at a distance from the mirror head and connectable to a wing mirror (2) of a vehicle (3),
    which bracket (5) comprises first and second bracket parts (7, 8) joined in a longitudinal direction and mutually connected through a pivoting means (9),
    wherein the first bracket part (7) faces towards the mirror head (4) relatively to the pivoting means (9) and the second bracket part (8) faces away from the mirror head (4) relatively to the pivoting means (9),
    wherein one of the fastening elements (6) is located at the first bracket part (7) facing the mirror head and another of the fastening elements is located at the second bracket part (8) facing away from the mirror head,
    wherein the pivoting means (9) comprises i) a hinge (10) with a central axis (11) directed transverse to the longitudinal direction of the first and second bracket parts (7, 8), and ii) a locking element (12) which is transferable from a
        a release position in which the first and second bracket parts (7, 8) are pivotable with respect to each other, and
        a locking position in which the first and second bracket parts (7, 8) are locked with respect to each other.

2. Mirror assembly (1) according to claim 1, wherein the bracket (5) is fastened to the mirror head (4) by a joint, in a stable and adjustable way.

3. Mirror assembly (1) according to claim 2, wherein the central axis (11) of the hinge (10) is directed perpendicular to the longitudinal direction of the first and second bracket parts (7, 8).

4. Mirror assembly (1) according to claim 1, wherein the mirror head (4) comprises a reflecting surface (17), and the central axis (11) of the hinge (10) is substantially transversely directed to the reflecting surface.

5. Mirror assembly (1) according to claim 1, wherein the fastening elements (6) each have a locking means (13) that is adjustable between a release position, in which position the fastening element is slidable along and/or pivotable about the respective first and second bracket part (7, 8), and a fixation position in which the fastening element is fixed with respect to that bracket part.

6. Mirror assembly (1) according to claim 1, wherein the fastening elements each comprise a clamp (6) that is connectable to an edge (20) of the wing mirror.

7. Mirror assembly (1) according to claim 6, for a wing mirror (2) comprising a mirror housing (19) with a rounded edge (20), in which mirror housing a mirror (21) is accommodated while leaving a slit between the outer perimeter of the mirror (21) and the inner perimeter of the peripheral edge (20) of the mirror housing, and a clamp (6) having a first jaw (14) that is insertable in the slit, a second jaw (15) connectable to the outside of the peripheral edge (20) of the mirror housing (19) and opposite the first jaw, and pressing means, for pressing the clamps together on the mirror housing.

8. Mirror assembly (1) according to claim 6, for a wing mirror (2) comprising a mirror housing (19) with a rounded edge (20), in which mirror housing a mirror (21) is accommodated while leaving a slit between the outer perimeter of the mirror (21) and the inner perimeter of the peripheral edge (20) of the mirror housing, and a clamp (6) having a first jaw (14) that is insertable in the slit, a second jaw (15) connectable to the outside of the peripheral edge (20) of the mirror housing (19) and opposite the first jaw, and pressing means comprising a screw/nut connection (16), for pressing the clamps together on the mirror housing.

9. The mirror assembly (1) according to claim 6, wherein, the wing mirror (2) comprises a mirror housing (19) with a rounded edge (20), in which mirror housing a mirror (21) is accommodated while leaving a slit between an outer perimeter of the mirror (21) and
    the first and second clamps connect the mirror assembly (1) at a peripheral edge (20) of the mirror housing.

10. Mirror assembly (1) according to claim 1, wherein the bracket (5) is embodied as a jointed bar (7, 8, 9).

11. In combination, a mirror assembly (1) according to claim 1, and a wing mirror (2) of a vehicle (3), to which the mirror assembly is fastened, wherein the wing mirror (2) has a mirror housing (19) with a curved perimeter (20) and wherein the first and second bracket parts (7, 8) of the mirror assembly are fixed with respect to each other at an angle different from zero, such that the fastening elements (6) are each aligned with respect to the respective opposite region of the perimeter of the mirror housing.

12. Mirror assembly (1) according to claim 1, wherein the bracket (5) is fastened to the mirror head (4) by a ball joint, in a stable and adjustable way.

13. Mirror assembly (1) according to claim 1, wherein the locking element (12) locks the hinge (10) such that i) in the locked position, the hinge (10) locks the first bracket part (7) facing towards the mirror head (4) in a fixed position relative to the second bracket part (8), and ii) in the release position, the hinge (10) allows the first bracket part (7) that faces towards the mirror head (4) and the second bracket part (8) to be pivotable with respect to each other.

14. The mirror assembly (1) according to claim 1, wherein,
the fastening elements each comprise a clamp (6), and
the wing mirror (2) comprises a mirror housing (19) with a rounded edge (20), in which mirror housing a mirror (21) is accommodated while leaving a slit between an outer perimeter of the mirror (21), and
each clamp connects to a peripheral edge (20) of the mirror housing.

15. A mirror assembly that mounts to a wing mirror (2) of a vehicle (3), wherein,
the mirror assembly (1) comprises
i) a mirror head (4),
ii) a bracket (5) fastened to the mirror head,
iii) first and second clamps (6) located at the bracket at a distance from the mirror head and connectable to the wing mirror (2) of the vehicle (3), and
iv) a lockable pivoting connection (9) comprising a hinge (10) and a locking element (12) that locks the hinge (10), wherein,
the bracket (5) comprises first and second bracket parts (7, 8) joined in a longitudinal direction and mutually connected through the lockable pivoting connection (9) with the first bracket part (7) joined to the second bracket part (8) by the lockable pivoting connection (9),
the hinge (10) has a central axis (11) directed transverse to the longitudinal direction of the first and second bracket parts (7, 8),
the first clamp is located on the first bracket part (7) and the second clamp is located on the second bracket part (8),
the first and second clamps connect the mirror assembly (1) to an edge of the wing mirror (2) so that the mirror head (4) is located longitudinally outboard of the wing mirror (2) and the first and second bracket parts (7, 8) are located above the wing mirror (2), the first bracket part (7) extending longitudinally outboard the wing mirror (2), and
the locking element (12) is transferable from
i) a release position where the hinge (10) allows the first and second bracket parts (7, 8) to pivot with respect to each other, and
ii) a locked position where the hinge (10) locks the first bracket part (7) in a user-selected fixed position relative to the second bracket part (8).

* * * * *